Oct. 8, 1929.   M. A. MARQUETTE   1,730,583
METHOD OF BUILDING CLINCHER TIRES
Filed March 26, 1926    2 Sheets-Sheet 1
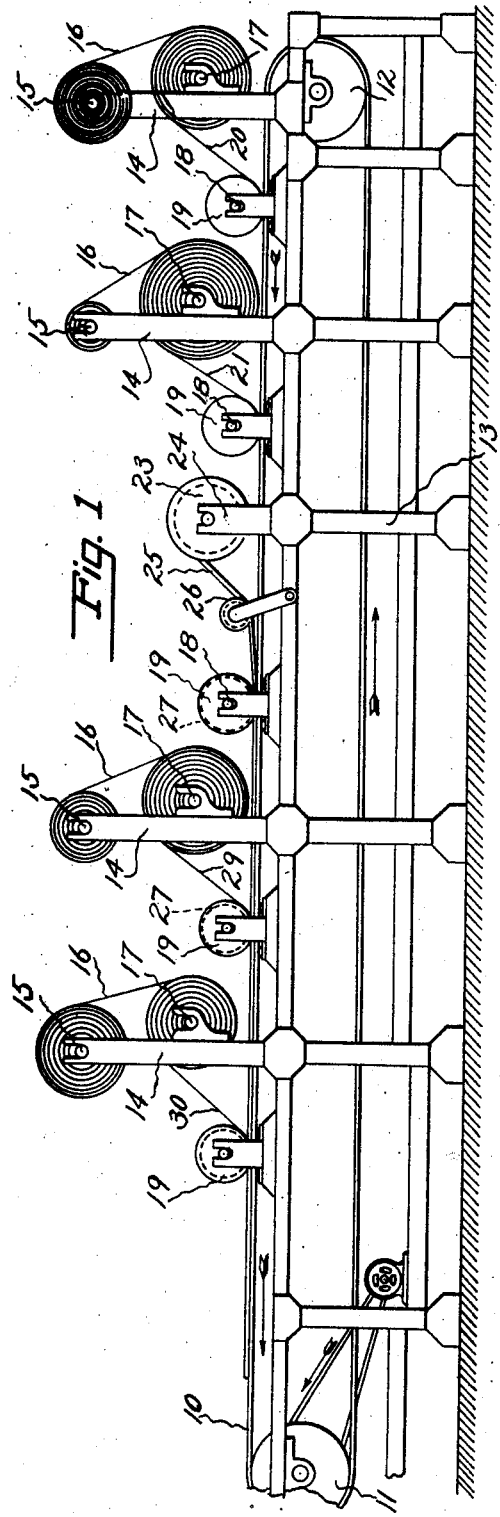
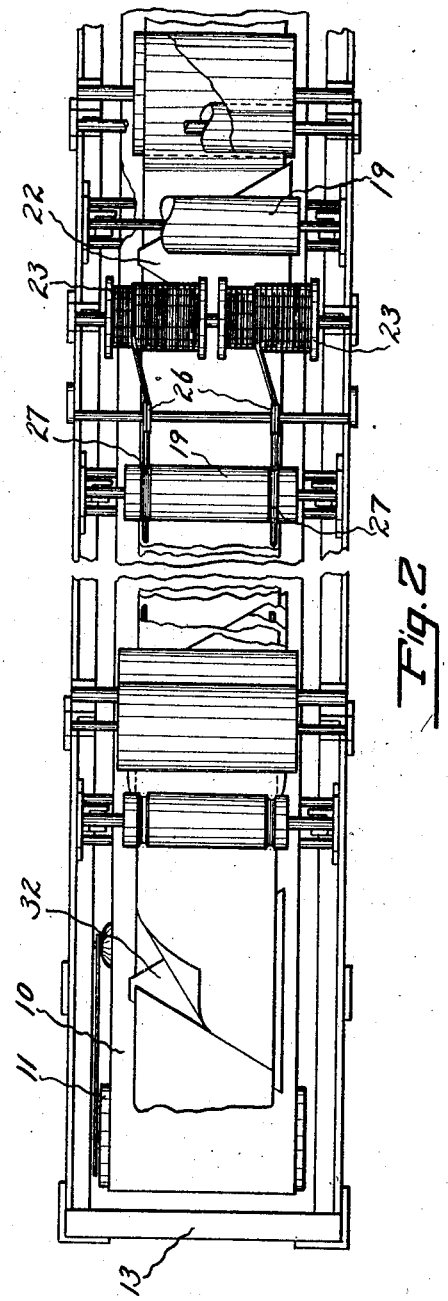
INVENTOR.
Melvin A. Marquette
BY
Edward C. Taylor
ATTORNEY.

Oct. 8, 1929.　　　　M. A. MARQUETTE　　　　1,730,583
METHOD OF BUILDING CLINCHER TIRES
Filed March 26, 1926　　　2 Sheets-Sheet 2
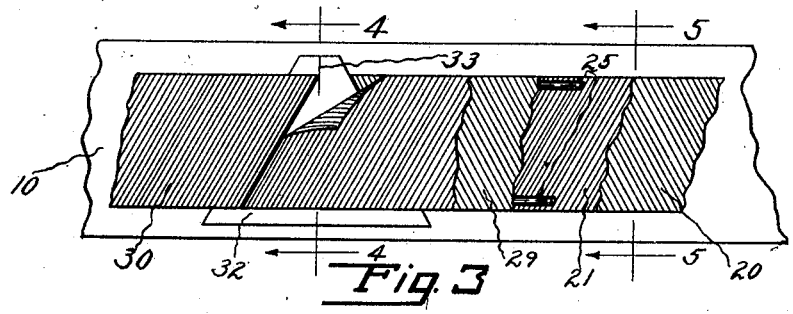
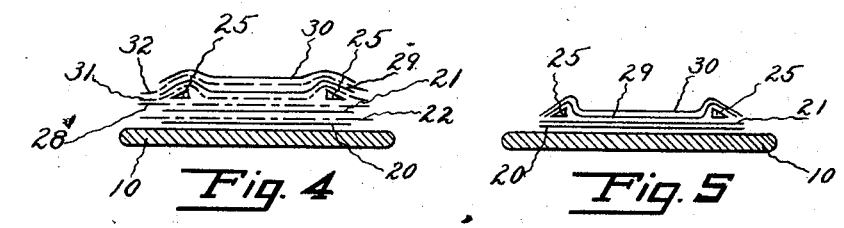
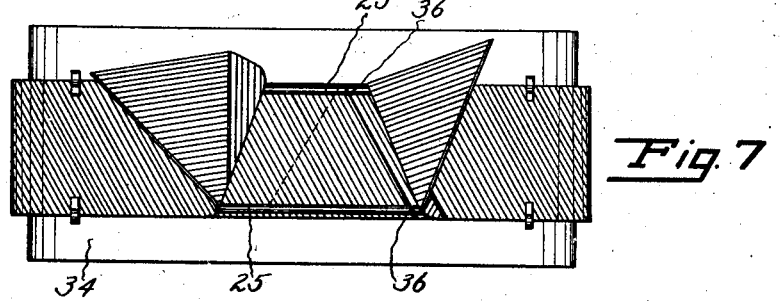
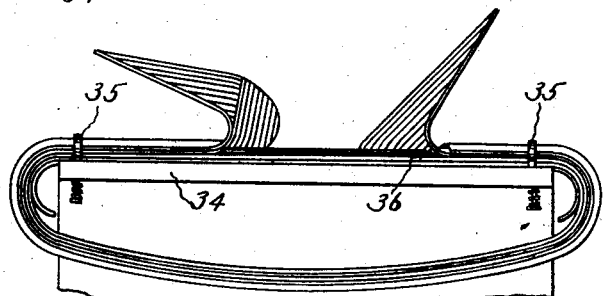
INVENTOR.
BY
ATTORNEY.

Patented Oct. 8, 1929

1,730,583

UNITED STATES PATENT OFFICE

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS

METHOD OF BUILDING CLINCHER TIRES

Application filed March 26, 1926. Serial No. 97,593.

This invention relates to the building of pneumatic automobile tires, particularly those of the clincher type. It has for its object the rapid production of such tires by a substantially continuous process. It has for another object the accurate laying of the several layers of material which enter into the tire. It has for a further object the substantial elimination of hand work in superimposing the several layers of material and stitching or pressing them into adherence.

Referring to the drawings,

Fig. 1 is a side elevation of an apparatus upon which the tire may be assembled;
Fig. 2 is a fragmentary top plan view thereof;

Fig. 3 is a detailed plan showing the method of separating the blanks for the production of individual tires;
Fig. 4 is a section on line 4—4 of Fig. 3;

Fig. 5 is a section on line 5—5 of Fig. 3;

Fig. 6 is an enlarged side elevation of a portion of Fig. 3;

Fig. 7 is a plan view showing an intermediate stage in the splicing of the blanks into endless form for use in a tire casing; and Fig. 8 is a side elevation thereof.

Generally stated, this method consists in superposing continuous strips of material to form a continuous, transversely flat band having the carcass plies and beads superposed as in the usual flat band tire casing. Between each adjacent pair of layers is provided a separator so that the plies may be separated at intervals to form individual blanks from which the tire casing may be formed. Each ply can be torn and folded back upon itself, the separator under it removed, and a corresponding operation performed on the underlying ply. This operation will be clearer after the drawings have been considered In Figs. 1 and 2 is shown an apparatus for assembling the continuous flat band from which the individual blanks are taken. A conveyor belt 10 is supported on pulleys 11 and 12 mounted upon a frame 13. At intervals along the frame are spaced standards 14, each of which supports the arbor 15 of a wind-up spool for lining material 16 and also an arbor 17 for tire material. Spaced beyond these pedestals are other pedestals 18 which support rollers 19 pressed by gravity, or otherwise, against the surface of the conveyor belt. Beginning at the right-hand end of the conveyor as viewed in Fig. 1, the first pedestal contains upon the arbor 17 a web of bias-cut tire body material 20. This is pressed by the roll in contact with the surface of the conveyor. The liner wind-up roll arbor 15 in this, as well as other cases, may be driven by hand or by suitable power means. The second arbor 17 carries a roll of material 21, similar to the material 20 except that the cords run in the opposite direction. This material is pressed by the roll 19 into firm adherence with the underlying layer 20.

Before the webs 20 and 21 are united by the second roll 19, a series of separators 22, preferably triangular in form, are laid at intervals along the web 20 corresponding to the length of the tire forming blank which it is desired to produce. These separators prevent the two webs adhering over a short portion of their length so that they may be torn along the line of cords in order to separate the continuous web into the desired blanks.

A pair of spools 23, supported upon pedestals 24, carry continuous layers of clincher bead fillers 25 which are guided by grooved rollers 26 and are pressed against the upper surface of the web 21 by a roller 19, similar to those described except that it has grooves 27 in its surface. Before the bead fillers come into contact with the web 21, a separator 28 is inserted between them directly overlying the separator 22. A third ply of material 29 is led from a third spool 17, and a fourth ply 30 from a fourth spool, each being pressed by rolls 19 as above described and being separated from underlying material by separators 31 and 32 respectively. Preferably the separator 32, if of triangular shape, is placed so that its apex points oppositely to the apex of the separator 22.

After all the webs and the bead fillers have been laminated into the composite band above described, the continuous composite web is torn apart along the lines indicated by guide-marks 33 on the separators. This is conveniently done on an extension of the conveyor belt 10 as indicated in Fig. 2. The bands are now ready for splicing into individual annular tire carcasses. A convenient method of doing this is shown in Figs. 7 and 8. The band is shown in these figures as looped around a table 34 which is held by any suitable standards, and which is provided with guiding clips 35 for holding the edges of the band. The separators are now removed and corresponding ends of the several plies are fitted together so that a unitary structure is built up. It will be noticed that, since the cords in the several plies alternate in direction, the angles at which the plies are severed will correspondingly cross each other. The bead fillers 25 are cut as at 36 along with one of the plies of material so that when the band is being spliced the ends of the bead fillers can be butted together in the manner shown in Fig. 7. The strength of cord fabric is entirely in the direction of the length of the cords and, since in the described construction the cords are not cut but the fabric torn along the line of the cords, the joints formed as in Figs. 7 and 8 will be found to be as strong as the rest of the fabric.

The flat band carcass produced as above described may now have the tread and such other covering rubber as desired applied to it. The band is then ready for expansion into tire form and vulcanization, all of which may be accomplished in any of the recognized manners.

Having thus described my invention, I claim:

A method of forming flat band clincher tire carcasses which comprises laminating a plurality of continuous flat webs of bias-cut cord fabric with the angle of the cords alternating, separating the successive layers of material by a superposed series of pieces of non-adherent material at intervals corresponding to the circumference of the band desired, incorporating continuous lengths of bead filler between certain of the plies as they are being laminated, severing the several layers of cord fabric along the lines of their respective cords at the points where the separators prevent their adherence, and with the length of each cut layer equal to the circumference desired in the band, severing the bead fillers at intervals equal to such circumference and at points within the non-adhering area defined by the separating pieces, removing the separating pieces, and splicing the band into endless form at the ends of each ply and with the ends of the bead fillers abutted and with the joints in adjacent plies crossing each other.

MELVON A. MARQUETTE.